United States Patent [19]

Shibata

[11] Patent Number: 4,993,800
[45] Date of Patent: Feb. 19, 1991

[54] CABLE FIXING MECHANISM IN A MULTICORE TYPE OPTICAL FIBER CABLE CONNECTOR

[75] Inventor: Sueji Shibata, Tokyo, Japan

[73] Assignee: Yamaichi Electric Mgf. Co., Ltd., Tokyo, Japan

[21] Appl. No.: 523,555

[22] Filed: May 15, 1990

[51] Int. Cl.⁵ .............................................. G02B 6/26
[52] U.S. Cl. ............................... 350/96.20; 350/96.21
[58] Field of Search ............... 350/96.20, 96.21, 96.22, 350/96.23, 96.33

[56] References Cited

U.S. PATENT DOCUMENTS

| H280 | 6/1987 | Thigpen | 350/96.20 |
|---|---|---|---|
| 4,140,367 | 2/1979 | Makuch et al. | 350/96.22 |
| 4,185,886 | 1/1980 | Corrales | 350/96.21 |
| 4,373,777 | 2/1983 | Borsuk et al. | 350/96.20 |
| 4,516,829 | 5/1985 | Borsuk et al. | 350/96.20 |
| 4,595,256 | 6/1986 | Guazzo | 350/96.21 |
| 4,711,520 | 12/1987 | Bernardini | 350/96.20 |
| 4,743,088 | 5/1988 | Balyasny et al. | 350/96.20 |
| 4,747,658 | 5/1988 | Borsuk et al. | 350/96.20 |
| 4,913,514 | 4/1990 | Then | 350/96.21 |
| 4,930,856 | 6/1990 | Pelta | 350/96.20 |

Primary Examiner—Brian Healy
Attorney, Agent, or Firm—Wenderoth, Lind & Ponack

[57] ABSTRACT

A cable fixing mechanism in a multicore type optical fiber cable connector has an outer shell holding cylinder for holding an outer shell of a terminal of a multicore type optical fiber cable press fitted to an outer surface thereof, a high tensile body press fit sleeve extending from a central portion of one end face of the outer shell holding cylinder and adapted to permit a high tensile body projecting from the terminal of the multicore type optical fiber cable to be press fitted to an inner surface thereof, and a plurality of outlet ports formed in a periphery of the high tensile press fit sleeve at the one end face of the outer shell holding cylinder and adapted to lead out the plurality of optical fibers therethrough.

1 Claim, 4 Drawing Sheets

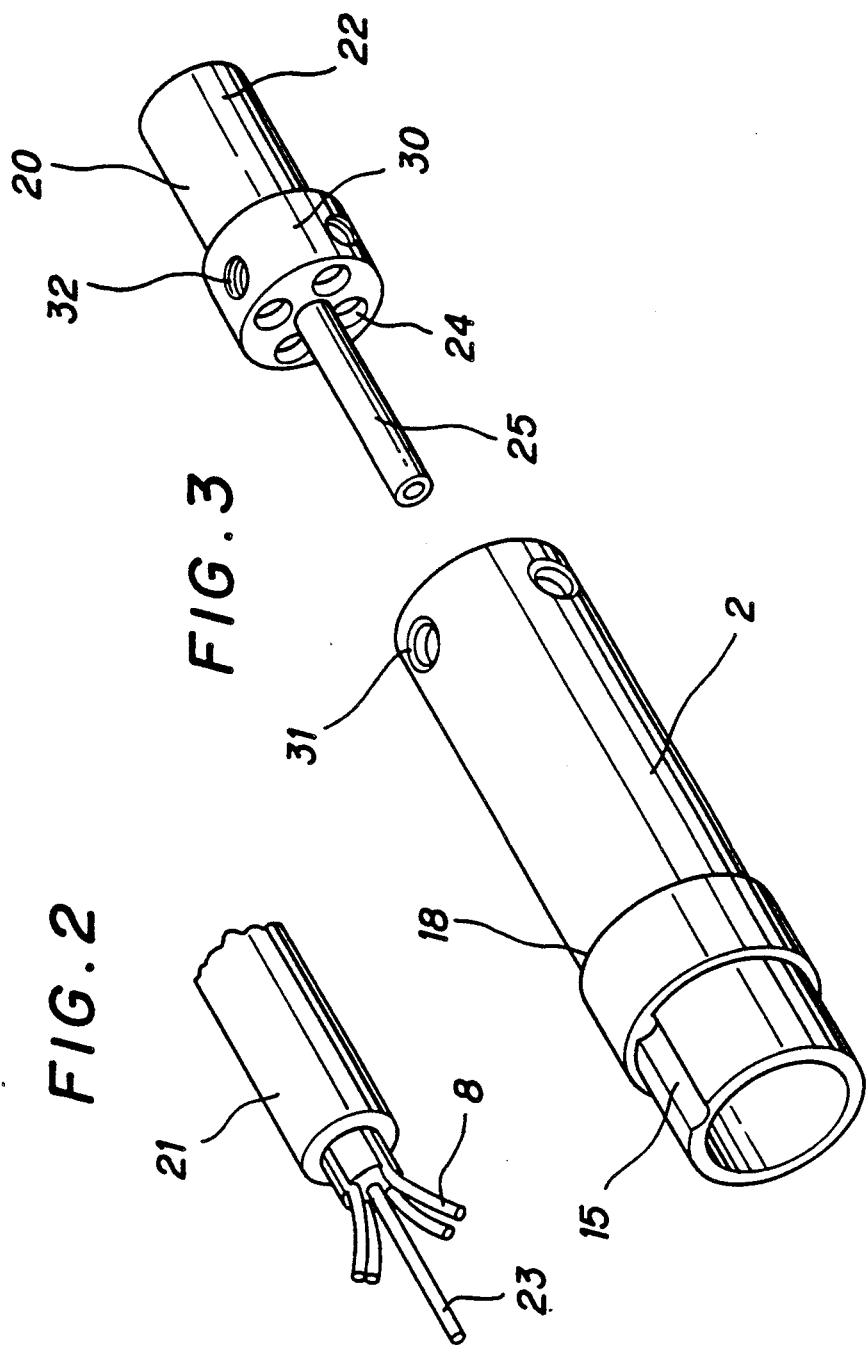

CABLE FIXING MECHANISM IN A MULTICORE TYPE OPTICAL FIBER CABLE CONNECTOR

BACKGROUND OF THE INVENTION

1. Field of the Invention

This invention relates to a cable fixing mechanism in a connector used in a multicore type optical fiber having a high tensile body in its center.

2. Brief Description of the Prior Art

In general, in a multicore type optical fiber cable connector, the cable is inserted from a rear portion of the connector and an outer shell of the cable is attached to connector through an adhesive agent interposed therebetween. However, as the cable is fixed to the connector only by the adhesive agent applied to a limited space just enough for the cable to be inserted therein, a sufficient adhering effect is difficult to obtain and a fixing strength is not sufficient. Also, in another prior art where a rear portion of a high tensile body is wound around a screw, etc. for fixture, there is a fear that loosening tends to occur to the screw, etc. As a result, it is difficult to obtain fixture against the tensile force of the cable with high reliability. Also, in still another conventional method for firmly clamping the outer shell of the cable, there is such a fear as that an optical fiber which is not strong against bend and twist, is damaged.

SUMMARY OF THE INVENTION

The object of the present invention is, in order to obviate the above problems, to provide a cable fixing mechanism in a multicore type optical fiber cable connector, which can be firmly fixed to the peripheral surface and the center of the cable against tensile force thereof by utilizing an outer shell of a cable and a high tensile body.

In order to achieve the above object, there is essentially provided a cable fixing mechanism in a multicore type optical fiber cable connector comprising an outer shell holding cylinder for holding an outer shell of a terminal of a multicore type optical fiber cable press fitted to an outer surface thereof, a high tensile body press fit sleeve extending from a central portion cf one end face of said outer shell holding cylinder and adapted to permit a high tensile body projecting from said terminal of said multicore type optical fiber cable to be press fitted to an inner surface thereof, and a plurality of outlet ports formed in a periphery of said high tensile press fit sleeve at said one end face of said outer shell holding cylinder and adapted to lead out said plurality of optical fibers therethrough.

In the present invention, the terminal of the multicore type optical fiber cable is inserted into the outer shell holding cylinder and is attached to the inner surface of the holding cylinder through an adhesive agent interposed therebetween or press fitted thereto by caulking the holding cylinder, and the high tensile body exposed from the terminal of the cable is inserted into the high tensile body press fit sleeve and press fitted thereto by caulking, so that the outer shell of the peripheral surface of the cable and the high tensile body at the center of the cable are firmly retained to realize the above-mentioned highly reliable cable fixture.

BRIEF DESCRIPTION OF THE DRAWINGS

The above and other objects and features of the present invention will become more manifest to those skilled in the art upon reading the following detailed description of the embodiment with reference to the accompanying drawings, wherein:

FIG. 2 is a perspective view of a terminal of the multicore type optical fiber cable;

FIG. 3 is an exploded perspective view of an inner cylinder and a cable holder.

DETAILED DESCRIPTION OF THE PREFERRED EMBODIMENT

Figure 1A:
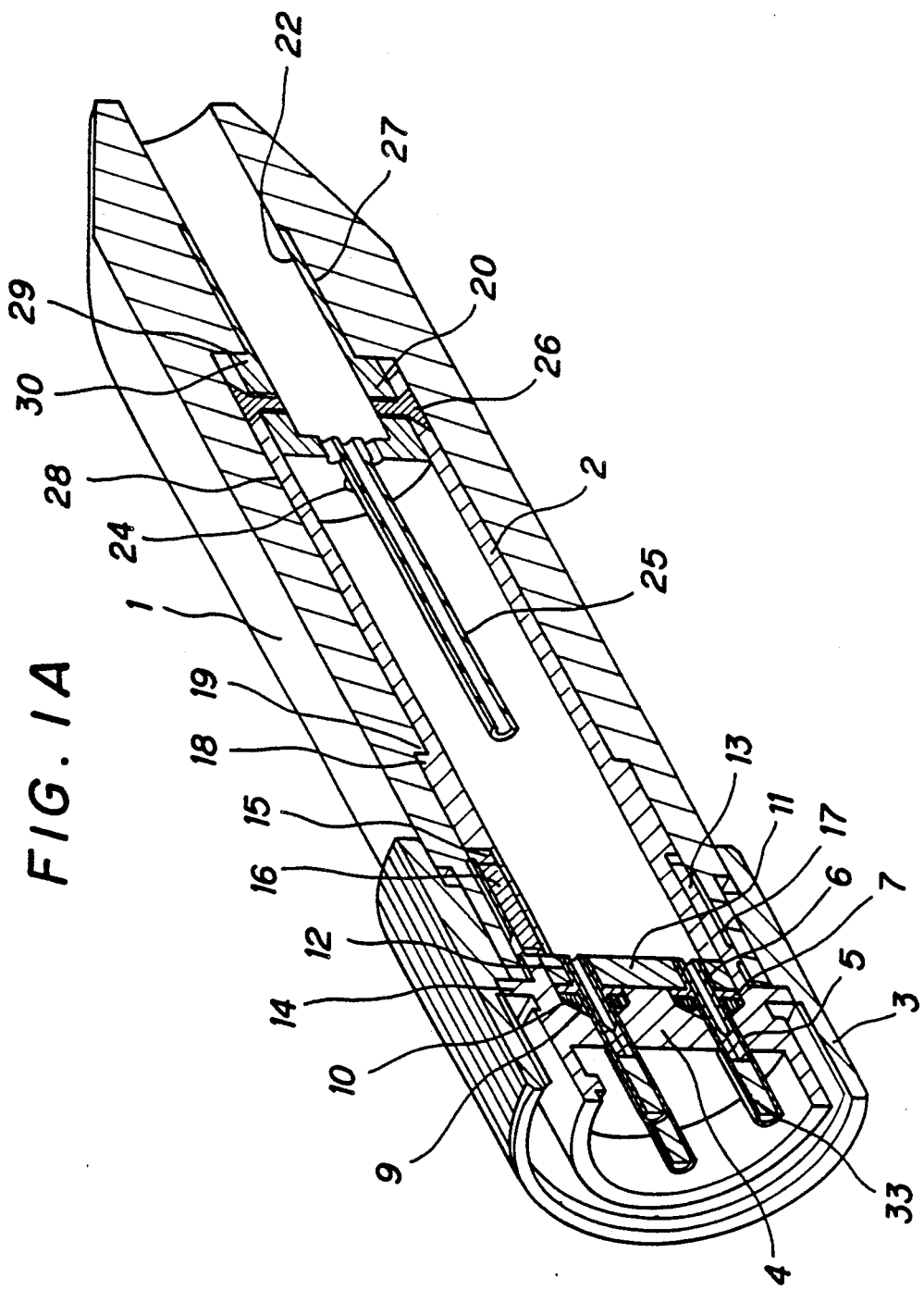
FIG. 1A is a perspective view of one preferred embodiment of the present invention in which a multicore type fiber cable connector is shown in section.
Figure 1B:
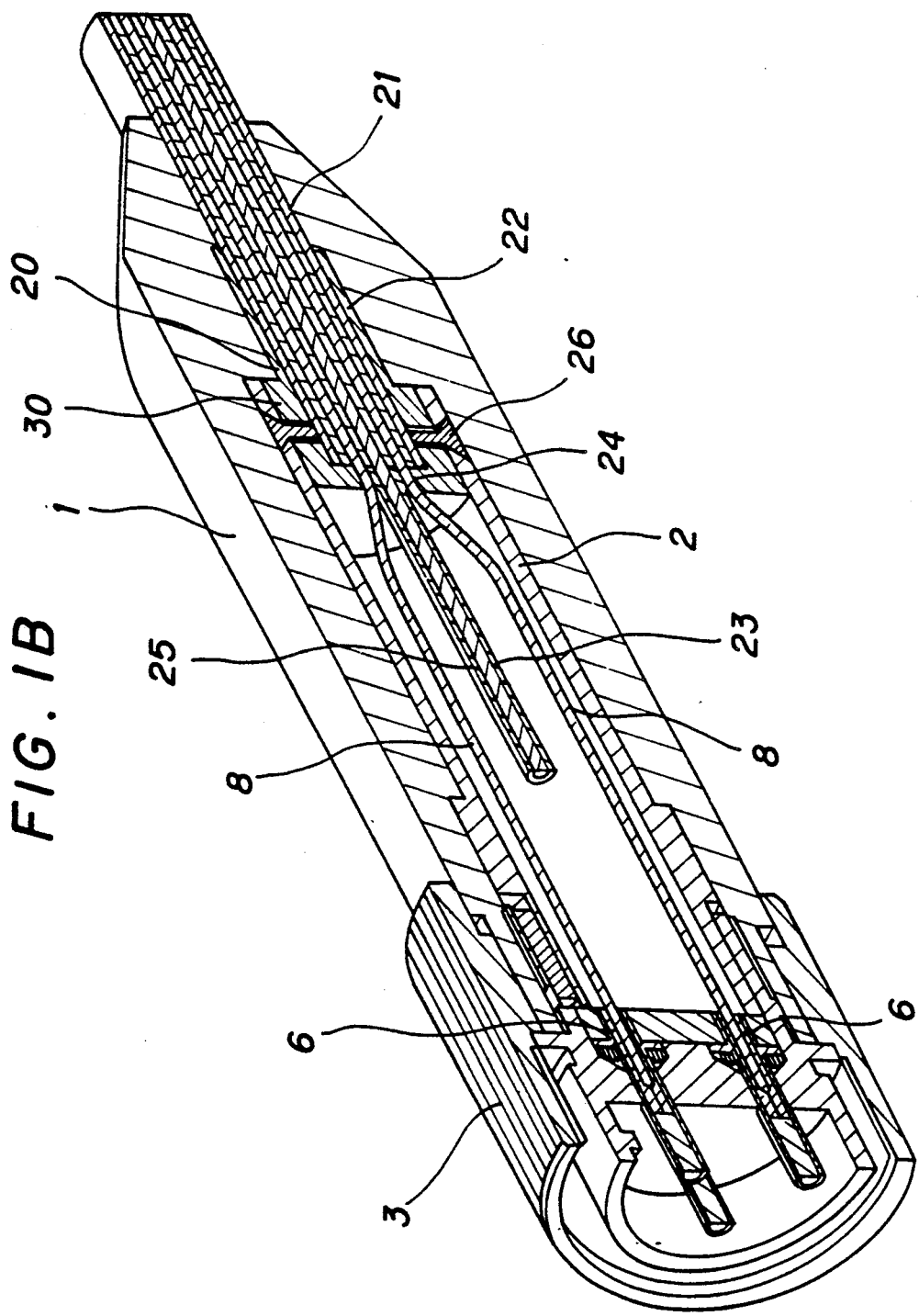
FIG. 1B is a perspective view of the connector connected with a cable.

One preferred embodiment of the present invention will now be described with reference to FIGS. 1 through 4.

The reference numeral 1 denotes an outer cylinder forming a housing connector, and the reference numeral 2 denotes an inner cylinder intimately inserted into the outer cylinder and has a coupling disposed on a tip thereof and a ferrule holder 4 disposed within the coupling 3 and formed of a disk. The ferrule holder 4 is provided with a plurality of ferrule thrusting holes 5 arranged at equal spaces on a concentric circle about the center of the holder 4. A ferrules 6 are thrust into the ferrule thrusting holes 5 respectively. The ferrule 6 has a sleeve-like shape and is provided with a flange portion 7 near the inner end portion and optical fibers 8 are thrust into the axial core.

The ferrule holder 4 is provided with a circular truncated conic O-ring accommodation chamber 9 formed at an inlet side of the ferrule 6 of the ferrule thrusting hole 5. An O-ring 10 is inserted into the accommodation chamber 9, and the O-ring 10 is held under compression between a conic wall surface of the accommodation chamber 9 and the ferrule 6.

The reference numeral 11 denotes a pressure disk of the O-ring 10 which is disposed on the rear surface of the ferrule holders 10 in order to maintain the pressure state of the O-ring 4 and obtains the compression of the O-ring 10 by pressurizing the flange portion 7 with the pressure disk 11 and urging the rear surface of the pressure disk 11 against an end face of the inner cylinder 2. The pressure disk 11 has a fiber inlet hole 12 for inserting the inner end of the ferrule 6 therein and opening up toward the inside the inner cylinder 2.

The ferrule holder 4 is provided with a screw cylinder 13 extending backward from the disk portion, the screw cylinder 13 is threadedly engaged 17 with inner peripheral surface of the front end portion of the outer cylinder 11, the screw cylinder 13 provided to the root portion of the screw cylinder 13 is abutted against the end face of the outer surface 1, and the coupling 3 loosely engaged with the outer peripheral surface of the front end portion is prevented from coming off by the flange portion 14.

Figure 4:
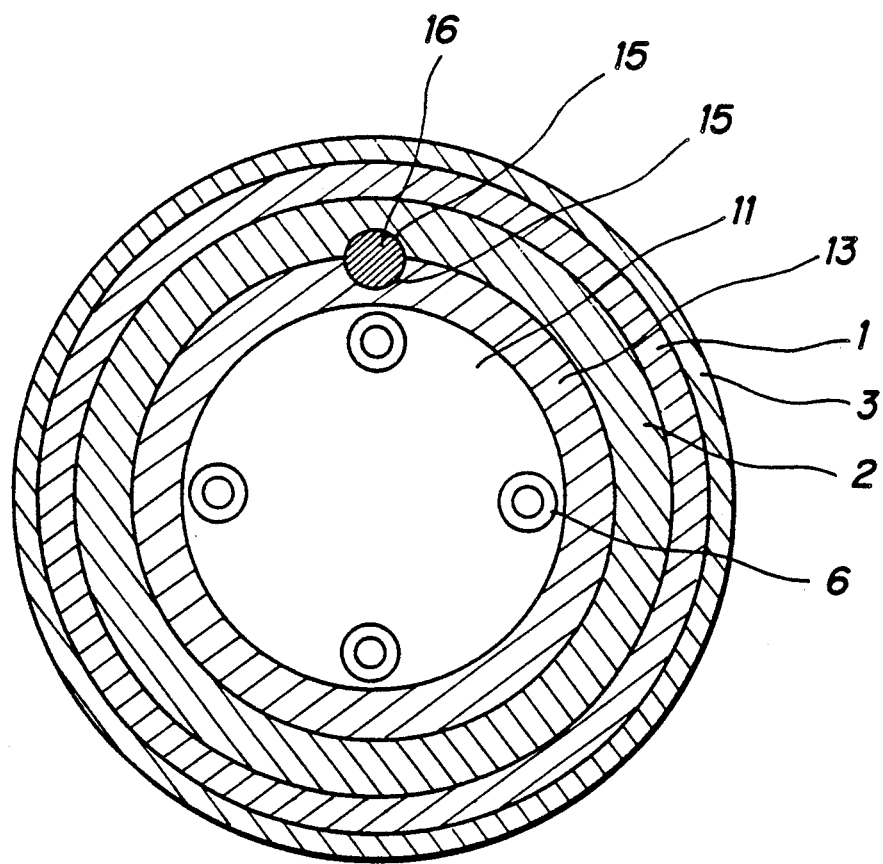
FIG. 4 is a sectional view of a key connecting portion between a ferrule holder and the inner cylinder.

Also, between a rear screw portion 13 of the ferrule 4 and a front end cylinder portion of the inner cylinder 2 which is intimately inserted therein, a circular key groove 15 is formed over the both cylinder portions as shown in FIG. 4 and a circular pin 16 is inserted into the key groove 15 in order to stop the rotation. Also, the inner cylinder 2 is provided with a annular step portion 18 at a suitable place of its extended portion into the outer cylinder 1. The annular step portion 18 is held in engagement with an annular step portion 19 formed in correspondence with the inner peripheral surface of the outer cylinder 1. By tightening the screw 17 hard, a pushing force toward the front end of the inner cylinder 2 is given to the inner cylinder 2. Then, the pushing force by the inner cylinder 2 is given to the pressure disk 11 in order to obtain compression of the O-ring 10. At the same time, the inner cylinder 2, the outer cylinder 1, the ferrule holder 4 and the pressure disk 11 are integrally assembled.

A cable holder 20 is inserted into a rear end portion of such constructed inner cylinder 2.

The cable holder 20, as shown in FIG. 3, includes an outer shell holding cylinder 22 for inserting a terminal of a multicore type optical fiber cable 21 therein in order to realize a press fit or attachment. The outer shell holding cylinder 22 is provided in one end face thereof with a plurality of outlet holes 24 for leading out the plurality of optical fibers 8 which arranged around the periphery of a high tensile body 23. The outlet holes 24 are arranged at equal spaces on a concentric circle about the center of the end face of the outer shell holding cylinder 22. The cable holder 20 is further provided with a high tensile body press fit sleeve 25 projecting from a central portion of its end face along the axis thereof and adapted to permit the high tensile body 23 projecting from the terminal of the multicore type optical fiber cable 21 to insert into therein from the outer shell holding cylinder 22.

The front end portion of the cable holder 20 having the cable outlet holes 24 is inserted into a rear end of the inner cylinder 2 and intimately press fitted to the inner peripheral surface of the inner cylinder 2. While, the outer shell holding cylinder 22 extending backward is inserted into a rear end of the outer cylinder 1 so that the high tensile body press fit sleeve 25 is stretched along the axis of the inner cylinder 2 and a free end of the front end of the sleeve 26 is served as a free end.

Furthermore, confronting portions of the inner cylinder 2 and the cable holder 20 are provided with mounting holes 31 and 32. By threadedly engaging a screw 26, which is threaded from the inner cylinder 2, with the mounting holes 31 and 32, the cable holder 20 is integrally fixed to the inner cylinder 2 and the high tensile body press fit sleeve 25 is stretched along the axis of the inner cylinder 2.

A holder insertion hole 27 for permitting the outer shell holding cylinder 22 of the outer cylinder 1 to be intimately inserted therein has a small diameter, while an inner cylinder insertion hole 28 for permitting the inner cylinder 2 to be intimately inserted therein has a large diameter. And a connecting portion formed therebetween is provided with a step portion 29 which is abutted with the rear end face of the inner cylinder 2 and a flange portion 30 dilated on the front end portion of the cable holder 20.

The outer shell holding cylinder 22 and the cylindrical portion (flange portion 30) with the fiber outlet holes 24 formed therein are formed into a single part by cutting or otherwise the flange portion 30 and the outer shell holding cylinder 22 are formed into separate members and are integrally formed by means of screw means, etc. The flange portion 30 is engaged with the rear end of the inner cylinder 2 and mounted to the inner cylinder 2 by means of the mounting holes 32 arranged on the flange portion 30.

In this way, the terminal of the cable inserted from the rear end face of the outer cylinder 1 is inserted into the outer shell holding cylinder 22, and fixed to the inner peripheral surface of the cable outer shell holding cylinder 22 through an adhesive agent. Otherwise, the outer shell holding cylinder 22 is press fitted by caulking and the high tensile body 23 pulled out from the terminal of the cable is inserted into the high tensile body press fit sleeve 25 and the sleeve 25 is caulked at a suitable place, thereby to firmly press fit the terminal of the high tensile body 23 into the inner surface of the sleeve 25. An adhesive agent may be applied while the high tensile body 23 is press fitted to the inner surface of the outer shell holding cylinder 22.

Owing to the above-mentioned arrangement, the multicore type optical fiber cable 21 is firmly retained at the central portion and the outer peripheral surface of the outer shell and the high tensile body 23 by the outer shell holding cylinder 22 and the high tensile body press fit sleeve 25.

In this way, the optical fiber 8 led out from the terminal of the cable is guided into the ferrule holder 4 passing through the fiber outlet holes 24 arranged on the periphery of the high tensile body press fit sleeve 25 and inserted into the corresponding ferrule 6 and fixed thereto by an adhesive agent etc. The reference numeral 33 denotes a lens disposed within the ferrule 6 in such a manner as to be opposite the end face of the fiber.

As described in the foregoing, according to the present invention, as the connector is provided with the cable holder, the terminal of the multicore type optical fiber cable is inserted into the outer shell holding cylinder of the connector and fixed thereto either by an adhesive agent or by means of press fitting and at the same time, the high tensile body led out from the terminal of the cable is inserted into the high tensile body press fit sleeve and press fitted thereto by caulking, thereby to firmly retain the outer shell of the peripheral surface of the cable and the high tensile body at the center of the cable. Accordingly, a highly reliable cable fixture can be realized, a tensile force exerted to the cable can be effectively prevented from being prevailed to the fiber, and an opposite state with respect to the corresponding optical fiber can be maintained properly. Furthermore, the above-mentioned object can be achieved with a simple construction.

Although one preferred embodiment has been described in detail, the present invention is not limited to this embodiment. It should be understood that various changes and modifications can be made without departing from the spirit of the present invention.

What is claimed is:

1. A cable fixing mechanism in a multicore type optical fiber cable connector comprising:
   an outer shell holding cylinder for holding an outer shell of a terminal of a multicore type optical fiber cable press fitted to an outer surface thereof;
   a high tensile body press fit sleeve extending from a central portion of one end face of said outer shell holding cylinder and adapted to permit a high tensile body projecting from said terminal of said multicore type optical fiber cable to be press fitted to an inner surface thereof; and
   a plurality of outlet ports formed in a periphery of said high tensile press fit sleeve at said one end face of said outer shell holding cylinder and adapted to lead out said plurality of optical fibers therethrough.

* * * * *